(12) United States Patent
Kolodji

(10) Patent No.: US 10,687,477 B1
(45) Date of Patent: Jun. 23, 2020

(54) PROCESS AND SYSTEM FOR DELIVERY OF LOW PRESSURE CO2 GAS FOR APPLICATION TO PLANTS

(71) Applicant: Brian Kolodji, Bakersfield, CA (US)

(72) Inventor: Brian Kolodji, Bakersfield, CA (US)

(73) Assignee: BLACK SWAN, LLC, Bakersfield, CA (US)

( * ) Notice: Subject to any disclaimer, the term of this patent is extended or adjusted under 35 U.S.C. 154(b) by 165 days.

(21) Appl. No.: 16/033,577

(22) Filed: Jul. 12, 2018

(51) Int. Cl.
  *A01G 7/02* (2006.01)
  *F17C 7/04* (2006.01)
  *A01G 9/26* (2006.01)

(52) U.S. Cl.
  CPC ............... *A01G 7/02* (2013.01); *F17C 7/04* (2013.01); *A01G 9/26* (2013.01); *F17C 2221/013* (2013.01); *Y10T 137/4891* (2015.04)

(58) Field of Classification Search
  CPC ........ F17C 7/04; F17C 2221/013; A01G 7/02; A01G 9/26
  USPC ......................................................... 137/268
  See application file for complete search history.

(56) References Cited

U.S. PATENT DOCUMENTS

| | | | | | |
|---|---|---|---|---|---|
| 1,760,953 A | * | 6/1930 | Martin, Jr. | ................. | F17C 7/04 62/54.2 |
| 1,970,058 A | * | 8/1934 | Ruff | .......................... | F17C 7/04 62/48.1 |
| 1,972,771 A | * | 9/1934 | Haid | .......................... | F17C 7/04 62/54.2 |
| 2,537,815 A | * | 1/1951 | Detherow | ................. | F17D 1/05 62/46.1 |
| 2,798,365 A | * | 7/1957 | Hesson | ...................... | F17C 7/02 62/47.1 |
| 4,615,352 A | * | 10/1986 | Gibot | ...................... | B01F 3/022 137/13 |
| 4,693,737 A | * | 9/1987 | Tyree, Jr. | .................. | F25D 3/10 62/384 |
| 4,817,332 A | * | 4/1989 | Ikeda | ........................ | A01G 7/02 47/17 |

(Continued)

*Primary Examiner* — Umashankar Venkatesan
(74) *Attorney, Agent, or Firm* — James M. Duncan, Esq.; Klein DeNatale Goldner

(57) ABSTRACT

A system delivers carbon dioxide to a facility having photosynthetic organisms, such as crops, plants, and trees. The system has a containment structure which houses a volume of liquid or solid carbon dioxide (dry ice). The containment structure has a containment structure inlet and a containment structure outlet. A gas source provides a fluid to the containment structure through the containment structure inlet. Upon entry into the containment structure, the gas or a saturated liquid encounters the solid or liquid carbon dioxide causing sublimation or evaporation, resulting in the formation of carbon dioxide gas or liquid which flows out of the containment structure through the containment structure outlet. The gas entering the containment structure may also have subcooled CO2 liquid or solid (snow), which replenishes the solid or liquid within the containment structure. To supplement evaporation or sublimation of the subcooled liquid or solid, heating means are used. A distribution line connected to the containment structure outlet delivers carbon dioxide gas or liquid which is flashed to gas upon release by CO2 emitters to the photosynthetic organisms.

24 Claims, 3 Drawing Sheets

(56) References Cited

U.S. PATENT DOCUMENTS

| | | | |
|---|---|---|---|
| 10,465,565 B2 * | 11/2019 | Spiry | ............... F25J 1/0095 |
| 2013/0180620 A1 * | 7/2013 | Praller | ............... F17C 5/02 |
| | | | 141/11 |

* cited by examiner

US 10,687,477 B1

PROCESS AND SYSTEM FOR DELIVERY OF LOW PRESSURE CO2 GAS FOR APPLICATION TO PLANTS

BACKGROUND OF THE INVENTION

This invention relates to carbon dioxide (CO2) and making beneficial use of carbon dioxide. This invention more specifically relates to using carbon dioxide in various phases, i.e., dense phase, liquid or solid phase carbon dioxide (dry ice), to generate carbon dioxide gas and direct the gas to plants which benefit from such application and which, through photosynthesis, converts carbon dioxide and water (H2O) to oxygen (O2) and sugar (glucose or C6H12O6) as per the equation $6CO_2 + 6\ H_2O + \text{sunlight} \rightarrow C_6H_{12}O_6 + 6O_2$. For purposes of this disclosure, organisms which process carbon dioxide according to this formula are also referred to as photosynthetic organisms.

Global warming is a result of increasing concentrations of greenhouse gases ("GHG") in the atmosphere. Among the primary greenhouse gases are water vapor, carbon dioxide, methane, nitrous oxide, perfluorocarbons, hydrofluorcarbons, and sulfur hexafluoride. Of these, carbon dioxide is the primary anthropogenic (i.e., manmade) GHG, accounting for a substantial portion of the human contribution to the greenhouse effect. Chemical reactions involving fossil fuels are the major source of anthropogenic carbon dioxide. Combustion occurring in mobile and stationary devices are the predominant contributors.

Reports in 2016 from NASA, the US EPA and the US Department of Energy state that 9 gigatons (that is 9 billion tons) of CO2 equivalents is annually added worldwide to the atmosphere by manmade processes. Much of the CO2 is from mobile sources such as fossil fuel combustion in aircraft, motor vehicles, and from stationary flue gas sources, such as coal fired power plants. It is further estimated that almost two thirds of the said 9 gigatons is produced in the US alone, and that the minimum amount of carbon dioxide required to be removed from the atmosphere simply to stop the advance of climate change is 4 gigatons per year.

There is an ongoing need for solutions to the continued disposition of carbon dioxide into the atmosphere. One such solution is bio-sequestration of the substance into photosynthetic organisms. However, delivery of carbon dioxide to such organisms presents a number of technical and logistical challenges.

SUMMARY OF THE INVENTION

Embodiments of the present invention provide a process (method) and system which provides a new solution to the previously identified problems.

The present invention provides for utilizing carbon dioxide in either liquid or dense phase or solid phase (i.e., dry ice) to generate gas phase carbon dioxide for application to photosynthetic organisms.

Embodiments of the present invention comprise a system for delivering a carbon dioxide gas to a facility having photosynthetic organisms, where the system has a containment structure which houses carbon dioxide in either liquid or solid phase, along with a gas phase component. The volume of solid or liquid carbon dioxide in the containment structure may be replenished with a gas source such as a dense phase/liquid phase pipeline or pressure vessel as described below. The volume of solid carbon dioxide may also be replenished with the manual or automated insertion of solid carbon dioxide blocks or pellets into the containment structure through either of the openings described below, or through a dedicated access structure. The containment structure has a containment structure inlet and a containment structure outlet. The system further comprises a gas source having a gas source outlet, where the "gas source" is defined as any structure capable of forming a gas. The gas may be carbon dioxide, flue gas, oxygen, nitrogen, air, and other common gases.

The gas source may be a flue gas generator, such as a stationary exhaust stack, which provides a gas source at low pressures and high temperatures (above 300 F). The gas source may also be a blower which receives the gas through an inlet and provides a gas source at low pressures and near ambient temperatures. The gas source may also be a compressor which receives the gas through an inlet and provides a gas source at medium (about 200 psig) pressures and moderate temperatures (below 300 F). The gas source may also be a high pressure (over 200 psig) pipeline or pressure vessel through which a gas phase carbon dioxide flows. The gas source may also be a high pressure pipeline or pressure vessel from which a liquid or dense phase carbon dioxide flows, where the carbon dioxide is introduced into the containment structure through a conduit connecting the pipeline to the containment structure, and the carbon dioxide, at least in part, forms a gas inside the conduit.

It is to be appreciated that if the gas source is a pipeline or pressure vessel from which high pressure gas phase, dense phase or liquid phase (usually highly concentrated) carbon dioxide flows, the gas source and accompanying system will be designed for and delivered at a much higher pressure (usually well above 75 psia) than the flue gas or air as provided by a blower These gas sources may also be utilized to replenish the liquid or solid carbon dioxide in the containment structure, because the depressurizing chills the carbon dioxide fluid and/or may flash any liquid present so as to be introduced into the containment structure as a colder gas and liquid or solid dry ice ("snow"). As liquid phase carbon dioxide above about 1100 psia is depressurized it exists as a chilled (subcooled) liquid phase, and when further depressurized to between about 1100 psia and 75 psia forms further chilled gas and liquid phases, and when further depressurized below 75 psia forms chilled gas and solid phases due to the Joule-Thomson (JT) effect and liquid flashing. As the solid CO2 (dry ice) within the containment structure is warmed above about −70 F, the CO2 sublimation/triple point/melt line, due to heating with the heating elements/tracing/vaporizer and when the pressure remains below about 75 psia the only phase present will be the gas phase. This means as the pressure drops through the control valves on the branch off of the gas or liquid phase or dense phase carbon dioxide pipeline or pressure vessel, a form of flowing CO2 snow or liquid will tend to occur, depending on the final let down pressure and temperature. Under these conditions CO2 gas can also co-exist. These two phase fluids will flow/be pushed into the containment structure because of the pressure differential. In the case of dense phase or gas phase CO2 from a pipeline or pressure vessel, depending on the initial temperature (if above about 120 F) and pressure within the pipeline or pressure vessel, the fluid even when depressured may also pass entirely as a chilled gas phase into the containment structure.

The fluid flows out through the gas source outlet and into the containment structure, which flow may be through either a length of conduit between or a direct connection of the gas source outlet and the containment structure inlet, having a first temperature at the containment structure inlet. Upon entry into the containment structure, if the gas encounters a volume of solid or liquid carbon dioxide and the inflowing gas has a higher temperature, sublimation of the solid carbon dioxide or evaporation of the liquid CO2 occurs resulting in the formation of an enriched (higher concentration of) carbon dioxide gas which leaves the containment structure at a lower temperature than the temperature of the inflowing gas. However, in the case where a pipeline or pressure vessel carrying gas or liquid phase or dense phase carbon dioxide as the gas source, gas or liquid phase or dense phase carbon dioxide flow through a conduit with Joule-Thomson valves into the containment structure inlet and may form snow or liquid thus replenishing the solid or liquid carbon dioxide inside the containment structure. In this case, sublimation of the solid carbon dioxide or evaporation of the liquid carbon dioxide may be initiated by heating of the conduit and the containment structure through electrical resistance, heating elements, tracing, liquid vaporizers, or other types of heaters. In this case the temperature of the fluid flowing into the containment structure inlet may be lower than the temperature of the outflowing gas or liquid phase carbon dioxide.

The carbon dioxide gas or liquid flows out of the containment structure through the containment structure outlet. In the case of a pipeline or pressure vessel, the flow is promoted by the pressure produced by the heaters in the containment structure and the containment structure outlet is connected to a distribution line with a let down or flow control valve, where the distribution line feeds a distribution system to CO2 emitters which deliver at least a portion of the carbon dioxide gas to a facility comprising photosynthetic organisms. In some embodiments, such as the case where the inflowing gas originates from a low pressure and hot flue gas source, a vacuum may be applied to the containment structure outlet utilizing a blower, compressor, or some other means to pressurize the gas into the distribution line. In this case, the hot flue gas entering the containment structure promotes more rapid (than ambient air) sublimation of the solid dry ice carbon dioxide and is cooled sufficiently by the cooling process sublimation to protect the blower or compressor from high temperature. The carbon dioxide gas or liquid flowing through the carbon dioxide distribution lines and carbon dioxide emitters is delivered as a gas to the facility comprising the photosynthetic organisms may also be diluted and/or cooled by air at ambient conditions, which air may be existing in and around the photosynthetic organisms, or introduced by inlets in the distribution line or through a separate inlet of a blower applying vacuum to the containment structure, or by air into the containment structure.

The application of the carbon dioxide to the plants provides a carbon-dioxide enriched micro-environment which, through photosynthesis and reaction with water, generates oxygen and glucose and bio-sequesters carbon dioxide in the plant, resulting in more robust root and shoot systems, increased crop yields, and potentially earlier harvests or multiple harvests. Thus, embodiments of the disclosed system utilize the captured carbon dioxide for a beneficial purpose.

DETAILED DESCRIPTION OF THE EMBODIMENTS

Figure 1:
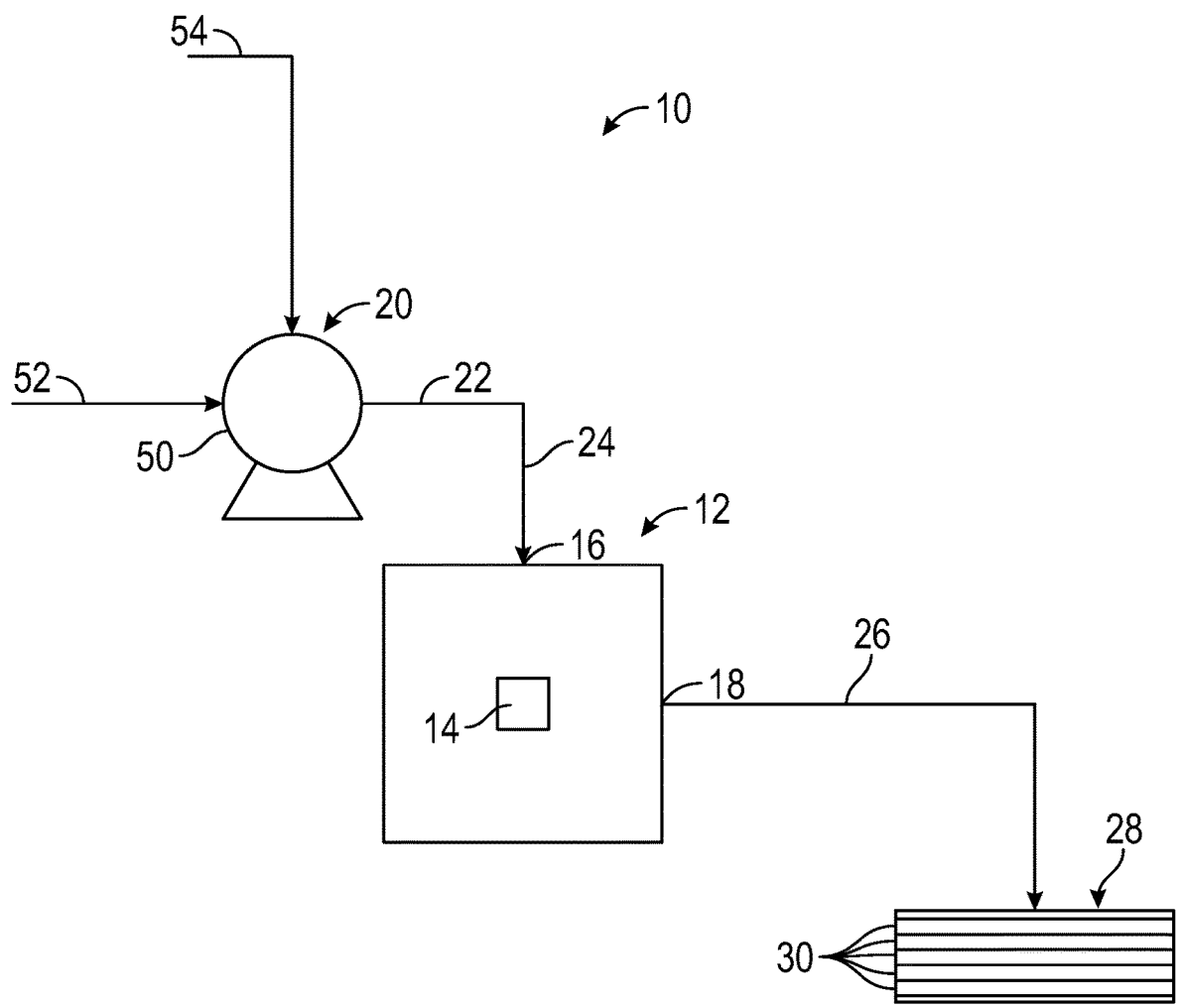
FIG. 1 schematically depicts an embodiment of the presently disclosed invention in which a gas is transferred into the containment structure inlet by a blower.
Figure 2:
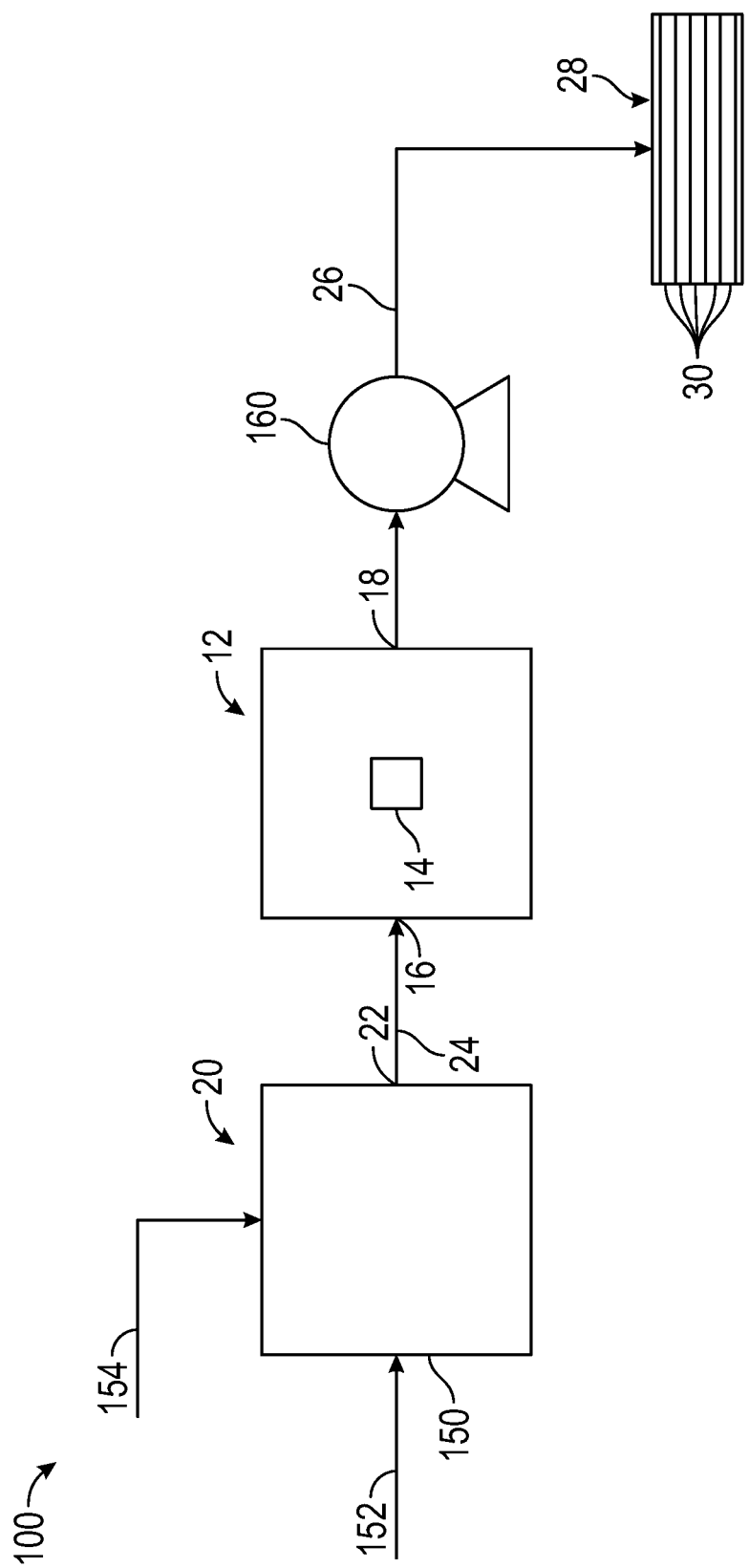
FIG. 2 schematically depicts an embodiment of the presently disclosed invention in which gas from a flue gas generator is drawn into the containment structure by a blower or compressor on the containment structure outlet.
Figure 3:
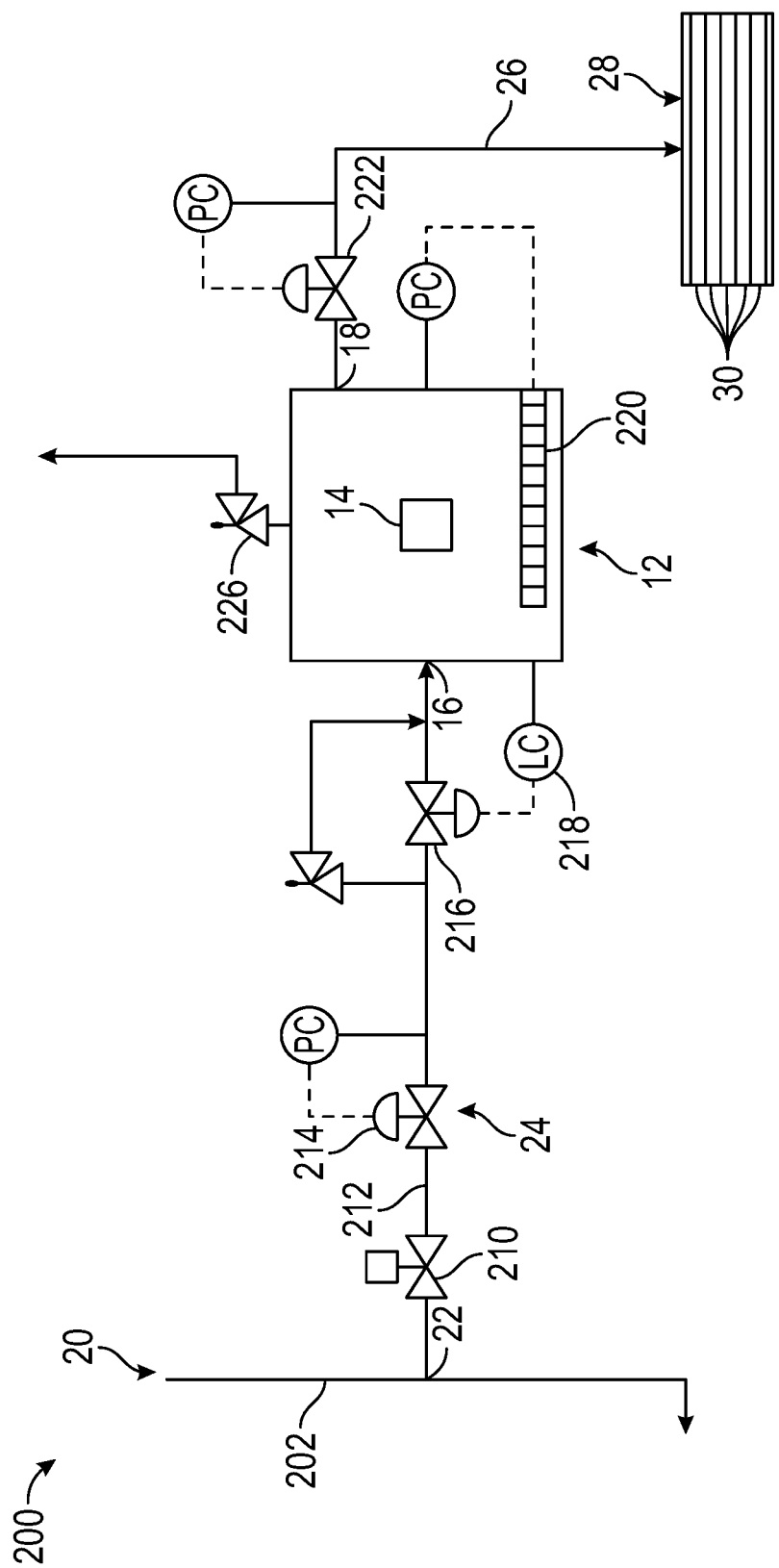
FIG. 3 schematically depicts an embodiment of the presently disclosed invention in which a pipeline transporting a substance is attached to the containment structure, where the substance may be a gas, liquid, or dense phase, but which forms a gas and liquid or solid phase between the pipeline or vessel and the containment structure.

Embodiments of the present invention are depicted in FIGS. 1-3. Each of the embodiments depicted in FIGS. 1-3 share the common elements of a containment structure 12, a volume of solid or liquid carbon dioxide 14 along with gas phase carbon dioxide contained within the containment structure, a containment structure inlet 16, a containment structure outlet 18, a gas source 20, a gas source outlet 22, a conduit 24 which connects the gas source outlet 22 to the containment structure inlet 16, and a distribution line 26 which delivers a gas or liquid phase comprising carbon dioxide from the containment structure 12 through to CO2 emitters 30 as a gas to a facility 28 comprising photosynthetic organisms. The distribution line 26 as connected to CO2 emitters 30 may be connected to a network of irrigation lines or other distribution ducting or hosing or piping and valve and/or nozzle components disposed within the facility 28. CO2 emitters 30, such as irrigation lines or other distribution ducting or hosing or piping and valve and/or nozzle components, may be buried, set at ground surface, or elevated. While many different photosynthetic organisms may be utilized for processing the carbon dioxide, certain crops which have a substantial fibrous matrix may be particularly effective in the bio-sequestration of carbon dioxide, such as cotton, hemp, flax, jute, and similar fibrous crops.

FIG. 1 depicts an embodiment 10 of the system generally described above. FIG. 1 schematically depicts an embodiment of the presently disclosed invention in which gas source 20 comprises a blower 50. Blower 50 has a first inlet 52 and may also have a second inlet 54. Air at ambient conditions may be delivered through the gas source outlet 22 into conduit 24, into the containment structure inlet 16 with blower 50. Second inlet 54 may be utilized to provide additional air or other gases, at controlled temperature or CO2 concentration if desired, to containment structure 12. Because of the relatively low operating pressures, containment structure 12 may be fabricated from sheet metal, ducting sheet metal, and comparable materials. Ambient condition (e.g. 60 degree F., 14.7 psia) gas may be delivered by the blower into the containment structure 12 where it encounters the very cold (−70 F) solid carbon dioxide 14 at near ambient pressure causing sublimation of the solid carbon dioxide resulting in the formation of carbon dioxide gas. The carbon dioxide gas flows out of containment structure 12 through containment structure outlet 18 and into distribution line 26, through CO2 gas emitters 30 which delivers the carbon dioxide gas to facility 28.

FIG. 2 also depicts an embodiment of the system generally described above. In this embodiment 100, gas source 20 may comprise a flue gas generator 150. Flue gas generator 150 receives fuel through fuel intake 152. Flue gas generator 150 may also blend a gas, such as air, for combustion, which is received through inlet 154. Hot exhaust gas containing carbon dioxide flows out of the flue gas source outlet 22 and is received through conduit 24 into containment structure inlet 16, and then into containment structure 12, where the incoming hot ambient pressure (e.g. 250 F+, 14.7 psia) gas encounters solid carbon dioxide 14 causing rapid sublimation of the very cold solid carbon dioxide resulting in the formation of enriched carbon dioxide gas which is sufficiently cooled and flows out of containment structure 12 through containment structure outlet 18. A blower 160 may be connected to containment structure outlet 18, where the blower pulls vacuum on containment structure 12 and delivers the gas into distribution line 26 through CO2 gas emitters 30 which delivers the carbon dioxide gas to facility 28.

As depicted in FIG. 3, an embodiment 200 of the present invention may also include the use of a pressurized pipeline 202 as the gas source 20, where the pipeline conveys fluid in a gas or liquid phase or dense phase. For example, pipeline 202 may be transporting carbon dioxide in a gas phase at a pressure below the critical pressure (about 1070 psia) and above the corresponding CO2 liquid dew point temperature, or in a liquid phase at a pressure above about 75 psia, the triple point pressure, and at low to moderate temperatures corresponding to the liquid CO2 bubble point (between and above the melt line at about −70 F, to below the critical temperature of about +88 degree F.) or in a dense phase at super critical conditions of pressure (above the critical pressure 1070 psia) and high ambient temperature (above the critical temperature of about 88 degree F.). In this embodiment, pipeline 202 may be utilized to replenish the solid or liquid carbon dioxide 14 disposed within the containment structure 12. The depressurized gas or liquid or dense phase carbon dioxide may be introduced into the containment structure 12 as liquid or "snow" (i.e., solid carbon dioxide) by applying Joule-Thomson cooling to the gas phase or the liquid phase or dense phase carbon dioxide as it flows from pipeline 202 to containment structure 12. In this way, solid or liquid carbon dioxide 14 within the containment structure 12 may be replenished.

By way of example, liquid phase carbon dioxide may flow through pipeline 202 at a pressure of 1000 psia and 60 degree F. As the carbon dioxide fluid exits pipeline 202 through gas source outlet 22 and flows into and through connecting conduit 24, it takes a pressure drop across a first control valve 214 (Joule-Thomson valve), followed by one or more control valves 216 sufficient to cool and depressure the carbon dioxide such that it enters containment structure 12 through containment structure inlet 16 in whole or in part as a liquid or solid phase (snow.) The connecting conduit 24 comprises an emergency shutdown valve 210. The connecting conduit 24 along with associated valves, piping and containment structure 12 may have heating means. Such heating means may include electric tracing, heating elements and vaporizers. If electric tracing is utilized, such a system may comprise external electric tracing, except for the gas source outlet 22, emergency shutdown valve 210, and all piping 212 to but not including the first Joule-Thomson valve 214. Evaporation of the liquid and sublimation of the dry ice (solid) carbon dioxide 14 within the containment structure 12 is supplemented by providing heating to the solid or liquid carbon dioxide 14 by equipping the containment structure with electric heating elements 220, liquid vaporizers, hot or tempered water heaters, or steam heaters or other heaters. In this embodiment, the temperature of the gas phase entering the containment structure 12 may be lower than the temperature of the gas phase leaving the containment structure.

Containment structure 12 and the connecting conduit 24 feeding the containment structure inlet 16 may comprise a pressure relief system 226 which allows venting of gas phase fluids at excessive pressures to a safe location. Further, the first Joule-Thomson valve 214 after the gas source outlet 22 on conduit 24 may be on downstream pressure control. An example would be to maintain the downstream pressure at 200 psia. The second Joule-Thomson valve 216 will, in conjunction with liquid level control 218 maintain the liquid level in the containment structure 12 to either an average level or will open to fill when a low level is reached to maintain submergence of the heating element 220 by liquid and stop filling by closing when a high level is reached so as to prevent overfilling/overpressuring the containment structure 12. Internal heating device 220 submerged below the liquid inside the containment structure 12 can modulate to maintain pressure of the gas within the containment structure at an average pressure of say 125 psia, or turned on when a low pressure is reached, say at 90 psia, and turned off when a high pressure is reached, say at 190 psia, after sufficient evaporation of the liquid to replenish the gas in the containment structure 12 takes place.

Gaseous carbon dioxide released from solid or liquid phase carbon dioxide 14 as well as other gas or liquid phase introduced into containment structure 12 may be released from containment structure 12 through distribution line 26 with a final Joule-Thomson valve 222 on flow control at a set flowrate of the gas for disposition into a distribution system of carbon dioxide emitters 30 for release of the carbon dioxide gas to the photosynthetic organism. The carbon dioxide emitters 30 may be placed within an existing irrigation system, as might commonly be found in an orchard or agricultural field containing photosynthetic organisms 28. Alternatively, a network or array of ducting or hosing or piping and valves and/or nozzle components may be utilized as carbon dioxide emitters 30 to otherwise release the CO2 gas to the photosynthetic organisms. The CO2 may be delivered as a pressurized (i.e. above 75 psia) gas to the final release point to the photosynthetic organisms, and may be released to the photosynthetic organisms through a valve or nozzle as a gas, and may include CO2 snow. Alternatively, the CO2 may be delivered up to the final release point to the photosynthetic organisms as a pressurized (i.e. above 75 psia) liquid and may be released through a valve or nozzle to the photosynthetic organisms as CO2 gas and may include CO2 snow. Liquid is not released to atmosphere as the liquid CO2 is instantaneously flashed at the atmospheric pressure outlet to the photosynthetic organisms in a very rapid liquid flashing phase transition process to a very cold gas and snow, where the snow may fall to the ground and further sublime to gas with the much slower sublimation phase transition process. Containment structure 12 may also have a drain (not shown) for release or removal of accumulated solids and/or impurities.

Another embodiment of the system, not shown, replaces the liquid/dense phase pipeline 202 with a pressure vessel feeding gas or liquid or dense phase fluid into the same conduit 24 leading to the containment structure inlet 16 of the containment structure 12. Another embodiment, not shown, would be to have a compressor or a pump feed pressurized fluid into the conduit 24 or directly into the containment structure inlet 16 of containment structure 12.

While the above is a description of various embodiments of the present invention, further modifications may be employed without departing from the spirit and scope of the present invention. Thus, the scope of the invention should not be limited according to these factors, but according to the following appended claims.

What is claimed is:

1. A system for delivering carbon dioxide gas to a facility comprising photosynthetic organisms, the system comprising:
   a containment structure containing a volume of solid carbon dioxide or a volume of liquid carbon dioxide, the containment structure comprising a containment structure inlet and a containment structure outlet;
   a gas source having a gas source outlet, wherein a fluid flows out of the gas source outlet;
   a conduit connecting the gas source outlet to the containment structure inlet, the fluid having a first temperature as it enters the containment structure, wherein an influx of the fluid causes either sublimation of the volume of solid carbon dioxide or evaporation of liquid carbon dioxide resulting in formation of a volume of carbon dioxide gas, wherein at least a first portion of said volume of carbon dioxide gas flows out of the containment structure outlet, said first portion of said volume of carbon dioxide gas having a second temperature; and
   a distribution line attached to the containment structure outlet wherein the distribution line delivers at least a second portion of said volume of carbon dioxide gas to the facility comprising photosynthetic organisms.

2. The system of claim 1 wherein the gas source comprises a flue gas generator.

3. The system of claim 1 wherein the gas source comprises a blower having a first blower inlet.

4. The system of claim 1 wherein the gas source comprises a pipeline.

5. The system of claim 1 further comprising means for replenishing the solid carbon dioxide inside the containment structure.

6. The system of claim 4 wherein the pipeline carries a dense phase carbon dioxide, said dense phase carbon dioxide forming a carbon dioxide gas phase as it depressurizes and flows from the pipeline to the containment structure inlet.

7. The system of claim 4 wherein the pipeline carries a liquid phase carbon dioxide, said liquid phase carbon dioxide depressurizing and flashing into a carbon dioxide gas phase as it flows from the pipeline to the containment structure inlet.

8. The system of claim 4 wherein a Joule-Thomson valve is disposed between the pipeline and the containment structure inlet.

9. The system of claim 8 wherein an external electric tracing is applied to a portion of the conduit.

10. The system of claim 4 wherein an internal heating device is disposed inside of the containment structure.

11. The system of claim 1 wherein a blower is disposed between the containment structure outlet and the distribution line, the blower applying a vacuum to the containment structure outlet.

12. The system of claim 1 wherein the at least first portion of said volume of carbon dioxide is diluted with air at ambient conditions.

13. The system of claim 1 wherein the first temperature is greater than the second temperature.

14. The system of claim 1 wherein the second temperature is greater than the first temperature.

15. The system of claim 1 wherein the distribution line is connected to a network of carbon dioxide emitters disposed within the facility comprising photosynthetic organisms.

16. The system of claim 3 further comprising a second blower inlet, the second blower inlet receiving a flow of air at ambient conditions.

17. A method of delivering a carbon dioxide gas mixture to photosynthetic organisms, the method comprising:
    introducing a fluid from a gas source into a containment structure through a containment structure inlet, wherein the containment structure contains a volume of solid or liquid carbon dioxide;
    generating an enriched carbon dioxide gas from the volume of solid or liquid carbon dioxide;
    releasing the enriched carbon dioxide gas from the containment structure through a containment structure outlet, wherein the containment structure outlet is connected to a distribution line; and
    applying the enriched carbon dioxide gas to the photosynthetic organisms.

18. The method of claim 17 wherein the gas source comprises a flue gas generator.

19. The method of claim 17 wherein the gas source comprises a blower.

20. The method of claim 17 wherein the gas source comprises a pipeline.

21. The method of claim 20 wherein the pipeline carries a dense phase carbon dioxide, said dense phase carbon dioxide forming a carbon dioxide gas phase as it flows from the pipeline to the containment structure inlet.

22. The method of claim 20 wherein the pipeline carries a liquid phase carbon dioxide, said liquid phase carbon dioxide flashing into a carbon dioxide gas phase as it flows from the pipeline to the containment structure inlet.

23. The method of claim 17 wherein the enriched carbon dioxide gas mixture is diluted with air at ambient conditions.

24. The method of claim 17 wherein the distribution line is connected to a network of carbon dioxide emitters disposed within a facility comprising the photosynthetic organisms.

* * * * *